United States Patent
Lingenfelder et al.

(10) Patent No.: US 8,122,045 B2
(45) Date of Patent: Feb. 21, 2012

(54) METHOD FOR MAPPING A DATA SOURCE TO A DATA TARGET

(75) Inventors: Christoph Lingenfelder, Poughkeepsie, NY (US); Stefan Raspl, Boudorf (DE); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 11/971,799

(22) Filed: Jan. 9, 2008

(65) Prior Publication Data
US 2008/0208855 A1  Aug. 28, 2008

(30) Foreign Application Priority Data
Feb. 27, 2007 (EP) .................................. 07103097

(51) Int. Cl.
*G06F 17/00* (2006.01)

(52) U.S. Cl. ......... 707/763; 707/770; 707/802; 707/722
(58) Field of Classification Search .................. 707/802, 707/722, 634, 770, 763
See application file for complete search history.

(56) References Cited

U.S. PATENT DOCUMENTS

| | | | |
|---|---|---|---|
| 6,389,429 B1 * | 5/2002 | Kane et al. | 707/609 |
| 2006/0106783 A1 * | 5/2006 | Saffer et al. | 707/3 |
| 2008/0065634 A1 * | 3/2008 | Krinsky | 707/6 |

* cited by examiner

*Primary Examiner* — Belix M Ortiz
(74) *Attorney, Agent, or Firm* — Shimokaji & Assoc., P.C.

(57) ABSTRACT

The invention relates to a method for mapping at least one data column from a database source to at least one data column of a data target, the method comprising: defining at least one reference column of the data target and at least one database source column; performing a comparison of data contained in the data column(s) with the reference column(s); and determining mapping candidates between the data column(s) and the reference column(s).

20 Claims, 12 Drawing Sheets

| TAB | COL | M | σ |
|---|---|---|---|
| T1 | C2 | 46.448 | 20.206 |
| T2 | C1 | 14.522 | 9.134 |
| T2 | C3 | 15008.32 | 4695.17 |
| T3 | C1 | 42.014 | 17.603 |
| T3 | C5 | 37.562 | 32.941 |
| T3 | C6 | 14713.10 | 1923.30 |
| T4 | C1 | 82.556 | 23.322 |
| T4 | C2 | 17.792 | 5.21 |
| T4 | C3 | 0.011 | 0.0032 |
| ... | ... | ... | ... |

FIG. 7

| TAB | COL | M | σ | DIS |
|---|---|---|---|---|
| T1 | C2 | 46.448 | 20.206 | |
| T3 | C1 | 42.014 | 17.603 | 0.160 |
| T3 | C5 | 37.562 | 32.941 | 0.659 |
| T4 | C1 | 82.556 | 23.322 | 0.793 |
| T2 | C1 | 14.522 | 9.134 | 0.879 |
| T4 | C2 | 17.792 | 5.21 | 0.965 |
| T4 | C3 | 0.011 | 0.0032 | 1.414 |
| T3 | C6 | 14713.1 | 1923.3 | 329.512 |
| T2 | C3 | 15008.32 | 4695.17 | 396.600 |
| ... | ... | ... | ... | ... |

FIG. 8

| TAB | COL | AVG_nb_w | Avg_nb_c | PER1 | PER2 | PER3 |
|---|---|---|---|---|---|---|
| T1 | C7 | 1.808 | 12.582 | 0 | 0.743 | 0.195 |
| T2 | C3 | 3.151 | 16.397 | 0.593 | 0.125 | 0.040 |
| T2 | C8 | 1.021 | 6.822 | 0.978 | 0.021 | 0 |
| T3 | C1 | 1.005 | 7.737 | 0.752 | 0.248 | 0 |
| T3 | C2 | 2 | 13.992 | 0 | 0.714 | 0.214 |
| T3 | C3 | 1 | 2.992 | 1 | 0 | 0 |
| T4 | C5 | 3.238 | 18.724 | 0.498 | 0.331 | 0.054 |
| T4 | C6 | 1.548 | 7.418 | 0 | 0.441 | 0.113 |
| T4 | C8 | 1 | 11 | 0 | 0.819 | 0.182 |
| T5 | C2 | 1 | 2 | 0.5 | 0.5 | 0 |
| T5 | C7 | 1.111 | 9.556 | 0.984 | 0 | 0.794 |
| T5 | C8 | 1.207 | 9.481 | 0.986 | 0 | 0 |
| T5 | C9 | 2.025 | 21.426 | 0.855 | 0.0957 | 0.0141 |
| ... | ... | ... | ... | ... | ... | ... |

FIG. 9

| TAB | COL | AVG_nb_w | Avg_nb_c | PER1 | PER2 | PER3 | DIS |
|---|---|---|---|---|---|---|---|
| T1 | C7 | 1.808 | 12.582 | 0 | 0.743 | 0.195 | 1.410 |
| T3 | C2 | 2 | 13.992 | 0 | 0.714 | 0.214 | 1.593 |
| T4 | C8 | 1 | 11 | 0 | 0.819 | 0.182 | 3.029 |
| T5 | C7 | 1.111 | 9.556 | 0.984 | 0 | 0.794 | 3.104 |
| T5 | C8 | 1.207 | 9.481 | 0.986 | 0 | 0 | 3.819 |
| T2 | C3 | 3.151 | 16.397 | 0.593 | 0.125 | 0.040 | 4.845 |
| T3 | C1 | 1.005 | 7.737 | 0.752 | 0.248 | 0 | 5.164 |
| T4 | C6 | 1.548 | 7.418 | 0 | 0.441 | 0.113 | 5.760 |
| T2 | C8 | 1.021 | 6.822 | 0.978 | 0.021 | 0 | 6.143 |
| T4 | C5 | 3.238 | 18.724 | 0.498 | 0.331 | 0.054 | 8.844 |
| T5 | C9 | 2.025 | 21.426 | 0.855 | 0.0957 | 0.0141 |  |
| T3 | C3 | 1 | 2.992 | 1 | 0 | 0 | 9.590 |
| T5 | C2 | 1 | 2 | 0.5 | 0.5 | 0 | 10.582 |
| ... | ... | ... | ... | ... | ... | ... | ... |

| TAB | COL | VAL | f |
|-----|-----|---------|------|
| T1 | C1 | red | 0.25 |
| T1 | C1 | green | 0.40 |
| T1 | C1 | blue | 0.35 |
| T2 | C1 | true | 0.55 |
| T2 | C1 | false | 0.45 |
| T2 | C2 | green | 0.30 |
| T2 | C2 | yellow | 0.20 |
| T2 | C2 | blue | 0.20 |
| T2 | C2 | red | 0.30 |
| T3 | C3 | married | 0.50 |
| T3 | C3 | divorced | 0.25 |
| T3 | C3 | single | 0.25 |
| T4 | C1 | Green | 0.15 |
| T4 | C1 | Jones | 0.25 |
| T4 | C1 | Johnson | 0.30 |
| T4 | C1 | Carter | 0.30 |
| ... | ... | ... | ... |

| TAB | COL | red | green | blue | Other |
|---|---|---|---|---|---|
| T1 | C1 | 0.25 | 0.40 | 0.35 | 0 |
| T2 | C1 | 0 | 0 | 0 | 1.0 |
| T2 | C2 | 0.30 | 0.30 | 0.20 | 0.20 |
| T3 | C3 | 0 | 0 | 0 | 1.0 |
| T4 | C1 | 0 | 0.15 | 0 | 0.85 |

FIG. 13

| TAB | COL | red | green | blue | Other | DIS |
|---|---|---|---|---|---|---|
| T1 | C1 | 0.25 | 0.40 | 0.35 | 0 | |
| T2 | C2 | 0.30 | 0.30 | 0.20 | 0.20 | 0.20 |
| T4 | C1 | 0 | 0.15 | 0 | 0.85 | 0.86 |
| T2 | C1 | 0 | 0 | 0 | 1.0 | 1.01 |
| T3 | C3 | 0 | 0 | 0 | 1.0 | 1.01 |

METHOD FOR MAPPING A DATA SOURCE TO A DATA TARGET

BACKGROUND OF THE INVENTION

The invention relates to data management and, in particular, to a method for mapping a data source to a data target.

Data analysts or data warehouse developers often have to solve data mapping problems when working on a data warehouse or when defining data transformation processes. In a typical scenario, new data is received from new data sources for loading into a data warehouse. The process requires that a data flow be defined specifying how the data sources are to be transformed and loaded into the target warehouse.

Figure 1:
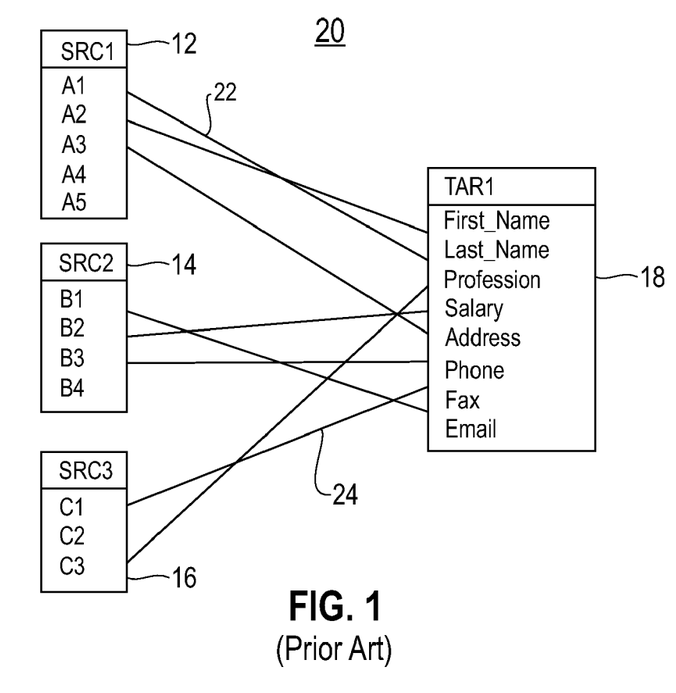
FIG. 1 is a diagram illustrating the problem of mapping of data, according to the prior art.

FIG. 1 illustrates a data flow 10 which can be used to illustrate the problem. A user obtains data from a first new source 12 (SCR1), a second new source 14 (SCR2), and a third new source 16 (SCR3) to a data target 18 (TAR1), such as a data warehouse. The semantics of the data target 18 is known and contains some data. The columns of the data target 18 are denoted, for example, with parameters FIRST_NAME, LAST_NAME, PROFESSION, SALARY, ADDRESS, PHONE, FAX, EMAIL. The first new source 12 includes columns with the headings A1, A2, A3, A4, and A5.

Similarly, the second new source 14 includes columns with the headings B1, B2, B3, and B4, and the third new source 16 includes columns with headings C1, C2, and C3. The semantics of the new sources 12, 14, and 16 is not fully known. A set of links 20 between the sources 12, 14, and 16 and the data target 18 exemplify one possible mapping: In this mapping, the column A1 from the first new table 12 contains the LAST_NAME information to be inserted in the corresponding column of the data target 18, as denoted by a link 22. The column C1 from the third new table 16 contains fax numbers which can be inserted into the column FAX of the data target 18, as denoted by a link 24.

Although the semantics of tables in the data warehouse may be known, and the data warehouse may already contain some data, but the documentation of the new data sources to load is often incomplete or may not exist. The schema, table and column names of the sources may not necessarily match those of the data warehouse, or the semantics of the columns of the sources may not be fully known, or the sources may contain a great number of tables and columns, making the search for the appropriate column difficult. The integration work in that case means that for each column in the target warehouse, the matching column providing the right information has to be found among all the columns contained in the new data sources. Or, alternatively, for each column in the data sources, the matching target column in the data warehouse has to be found.

Even if the semantics of both source and target are known, a large number of potential sources and targets and non-obvious or different naming convention can make the mapping work a very tedious task for the user. In that case, if a tool used to define the mapping can provide some help by suggesting the most probable source for each target or the most probable targets for each source, the time needed for this task can be reduced significantly.

To overcome this problem, some tools already try to provide some help to the user to find potential matching candidates. These prior art tools usually perform a syntax analysis of the metadata to find potential sources and targets having "similar" names and data signatures. In these analyses, only the metadata, that is, the name and definition of each column, are used to guess the mapping candidates. However, the name of the columns of the data sources, such as, for example, production data, can be very different from the names used in the target schema, such as in a data warehouse). The naming convention and the model used in a warehouse is usually designed to be easily understood by a human, while production data often use some schema and naming conventions which are not primarily designed to be comprehensible to a human. In that case, where the names used in the sources and targets have no similarity, an method analyzing the table and column names will fail finding matching candidates.

The names of the sources and targets may both use a similar naming convention, but these names may be in different languages or may follow different naming conventions. This is a common problem where data coming from different countries have to be integrated. The column names used in the different source countries may be expressed in the language of the respective country. In that case a method which only tries to find similar names between sources and target will fail in most cases. To overcome this problem, such methods may try to use a dictionary and check for synonyms and possible translations. The terms used as table and column names are rarely complete words, but are often shortened words or else may contain special characters or digits. Additionally, the data sources may not have complete metadata. A 'flat' file, for example, may have no column names defined. In such cases, the prior art methods will typically fail.

What is needed is a method that provides for the identification of mapping candidates even if the metadata or documentation are not complete, or even if the naming conventions used between sources or targets are different.

SUMMARY OF THE INVENTION

In one aspect of the present invention, a method for mapping data from a database source to a data target comprises. defining at least one reference column of the data target; performing a comparison of data contained in at least one data column and data contained in at least one reference column; determining mapping candidates between the at least one data column and the at least one reference column based on the comparison of data.

In another aspect of the present invention, a program product comprises a computer useable medium including a computer readable program, wherein the computer readable program when executed on a computer causes the computer to: perform a comparison of data contained in at least one data column of a database source with data in at least one reference column; and determine mapping candidates between the at least one data column and the at least one reference column based on the comparison of data.

These and other features, aspects and advantages of the present invention are better understood with reference to the following drawings, description and claims.

BRIEF DESCRIPTION OF THE DRAWINGS

The present invention together with the above-mentioned and other objects and advantages may best be understood from the following detailed description of the embodiments, but not restricted to the embodiments, wherein is shown schematically:

FIG. 13 is a table illustrating search result of a search for similar columns containing categorical data.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

According to the present invention, an efficient way for mapping a data source to a data target which is essentially independent of language and which can be applied even if the metadata or the documentation of the data source is incomplete. The shortcoming of deriving mapping candidates by comparing the metadata, such as data column names and data description of table sources and targets are not used. Instead, the claimed method compares the data of table sources and targets. The search for mapping candidates is, accordingly, independent of the metadata or other existing documentation. The claimed method thus provides for the identification of mapping candidates even if the metadata or documentation are not complete, or even if the naming conventions used between sources or targets are different. For example, a target column may be named PERSON.PHONE and may contain phone numbers. If the sources contain several hundreds of columns without meaningful names, and if most of the columns have a data type compatible with the target column, the claimed method will allow a user to find the source columns whose contents are most similar to phone numbers, even if the source metadata may provide little or no useful information.

In the claimed method, one or more data columns of one or more data sources are mapped to one or more data columns of a data target. One or more of the reference column of the data target may be defined, a comparison of data contained in one or more data columns of the data sources and in the reference columns may be compared, and mapping candidates may thus be determined between the data columns and the reference columns of the data target based on comparison of data. In an exemplary embodiment, the data target and the data source are databases. By using the claimed method, related columns, that is, columns containing the same kind of data, can be found by analyzing the data itself, rather than depending on a well documented metadata model. The same method can be used for other types of data. For instance, BLOB (binary large object) data can be compared with each other by collecting statistics about the average/standard deviation of its size. XML (extensible markup language) columns can be compared by their size and schema.

The claimed method can be combined with the traditional method of using metadata to improve the results: The claimed method can be run first to identify, for example, the ten best candidates for a specific target column based on respective contents. If the column names and metadata have additional similarities, the list of candidates can be refined by using classical methods. The claimed method can be embodied in a program product comprising a computer useable medium, including a computer readable program, wherein the computer readable program when executed on a computer causes the computer to perform any one of the steps of the method. In an exemplary embodiment, the mapping candidates can be determined, based on a comparison of statistical properties of data columns of data source(s) and data columns of the data target.

With the statistical approach, there is no need to know semantics or to know statistics beforehand. The data can be of various types, such as numbers, addresses, classifiers, and color tags, for example. The statistics can be mean, variation, shape of distribution and the like and can be chosen appropriately. The statistics used for the comparison can be computed as a function of the data type contained in the data columns of the data source(s) and the data target. Each column of each data source and data target can be annotated with consistent statistics. For a numeric column, the mean, the standard deviation, and the distribution of the data can be calculated. For a categorical column, that is, a column containing a finite set of possible values, the statistics may be the distribution frequencies. For a column containing free text, the statistics may contain information about the average number of words, of characters, the relative frequencies of letters, digits or special characters, and/or the distribution of each possible character or group of characters.

The computing of statistics can be initiated when one or more new data sources, which are intended for being loaded into the data target, are registered. Additionally or alternatively, computing of statistics can start when one or more new data targets are registered into which data sources are intended for being loaded into a data target. Additionally or alternatively, it is possible to compute the statistics periodically. Additionally or alternatively, the statistics can be computed when a user starts mapping data source and data target, for relatively small databases.

The present method uses statistics selected for computing that are essentially descriptive, and may be the same for data for all data columns of the same type. The statistics can be computed or may be available in a storage device. The data can be categorized prior to computing the corresponding statistics. If the data source is a table in a relational database, the type of data depends on the SQL (SQL=structured query language) type of the column. The term 'data type' does not refer to the SQL type itself but to a more generic categorization. For instance, the SQL types for 'integer,' 'float,' and 'double,' for example, may all be categorized as numeric type, because they all contain numeric information. The same type of statistics can be computed for these SQL types, such as mean and standard deviation.

Character based types, on the other hand, can contain two different types of data: categorical data or free text. Categorical data are character based data which can have only a finite set of possible value such as, for example, {true, false} or {married, divorced, single, widow}. Free text data are character based data which are rarely repeated, such as, for example, a comment, an address, a phone number, or a person's name. Such data are sometimes hidden in numeric columns, but can be detected by counting the number of different numeric values.

Accordingly, a similarity between the statistics of data of a reference column and a source data column can be computed. The similarity (or distance) is a numerical value which indicates the similarity of two sets of statistics. This value can be computed by using various mathematical or statistical functions, also known as 'similarity' or 'distance measures.' For example, a Euclidean n-distance, or a chi-squared test, or a data mining method such as clustering may be used to determine whether the statistics are close enough in a cluster.

Figure 2:
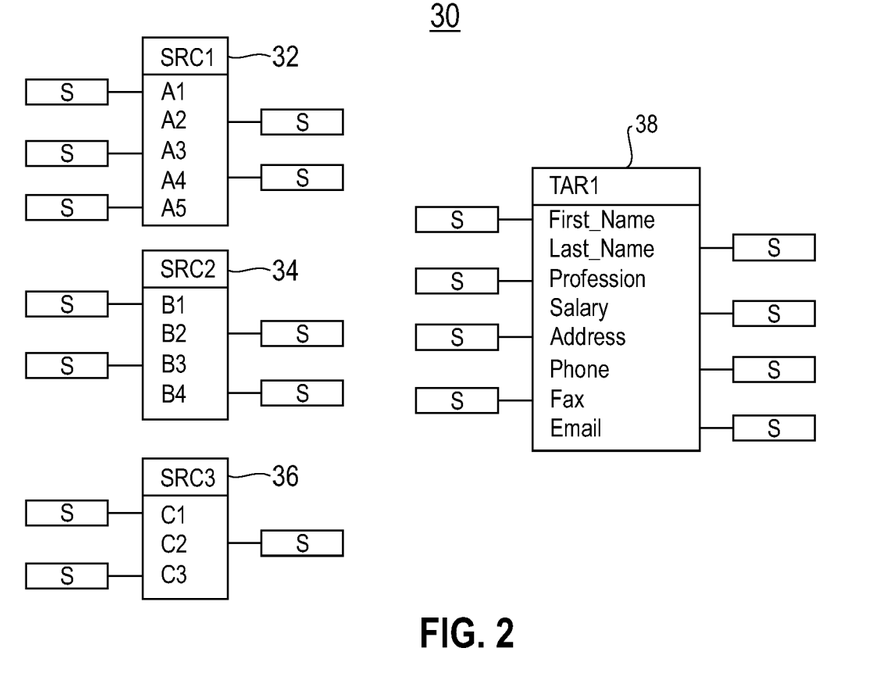
FIG. 2 is a diagram illustrating the annotation of statistics to data columns of data sources and a data target, in accordance with the present invention.

An exemplary embodiment of column annotations, in accordance with the present invention, may be explained with reference to FIG. 2, in which, statistics are computed for each column of each known data source and target, and these statistics are compared when the user asks for a mapping candidate for a specific column. Known data sources are denoted by a first source 32 (SRC1), a second source 34 (SRC2), and a third source 36 (SRC3). A data target 38 (TAR1) is provided as an example of a known target. Each column of each source 32, 34, and 36 and of the data target 38 has to be "annotated" with consistent statistics in order that mapping candidates may be obtained based on the data contained in the sources SCR1, SCR2, SCR3 and target TAR1.

In the example provided, statistics, denoted by boxes labeled "S," may be computed for each column A1, A2, A3, A4, A5 in the first source 32, for each column B1, B2, B3, B4 in the second source 34, and for each column C1, C2, C3 in the third source 36. In the example provided, the columns in the data target 38 have the headings labeled as FIRST_NAME, LAST_NAME, PROFESSION, SALARY, ADDRESS, PHONE, FAX, and EMAIL. The computed statistics are a function of the data type in the respective columns A1, . . . , A5, B1, . . . , B4, C1, C2, C3 and FIRST_NAME, . . . , EMAIL. For example, for a numeric column the mean, the standard deviation and the distribution of the data may be computed. For a categorical column, that is, a column containing a finite set of possible values, the statistics may be the distribution frequencies. For a column containing free text, the statistics may contain information about the average number of words, of characters, the relative frequencies of letters, digits or special characters, and/or the distribution of each possible character or group of characters. Thus, in a preferred embodiment, the statistics describe the data, and may be computed or already available for all columns of the same type, so that a comparison is possible.

Figure 3:
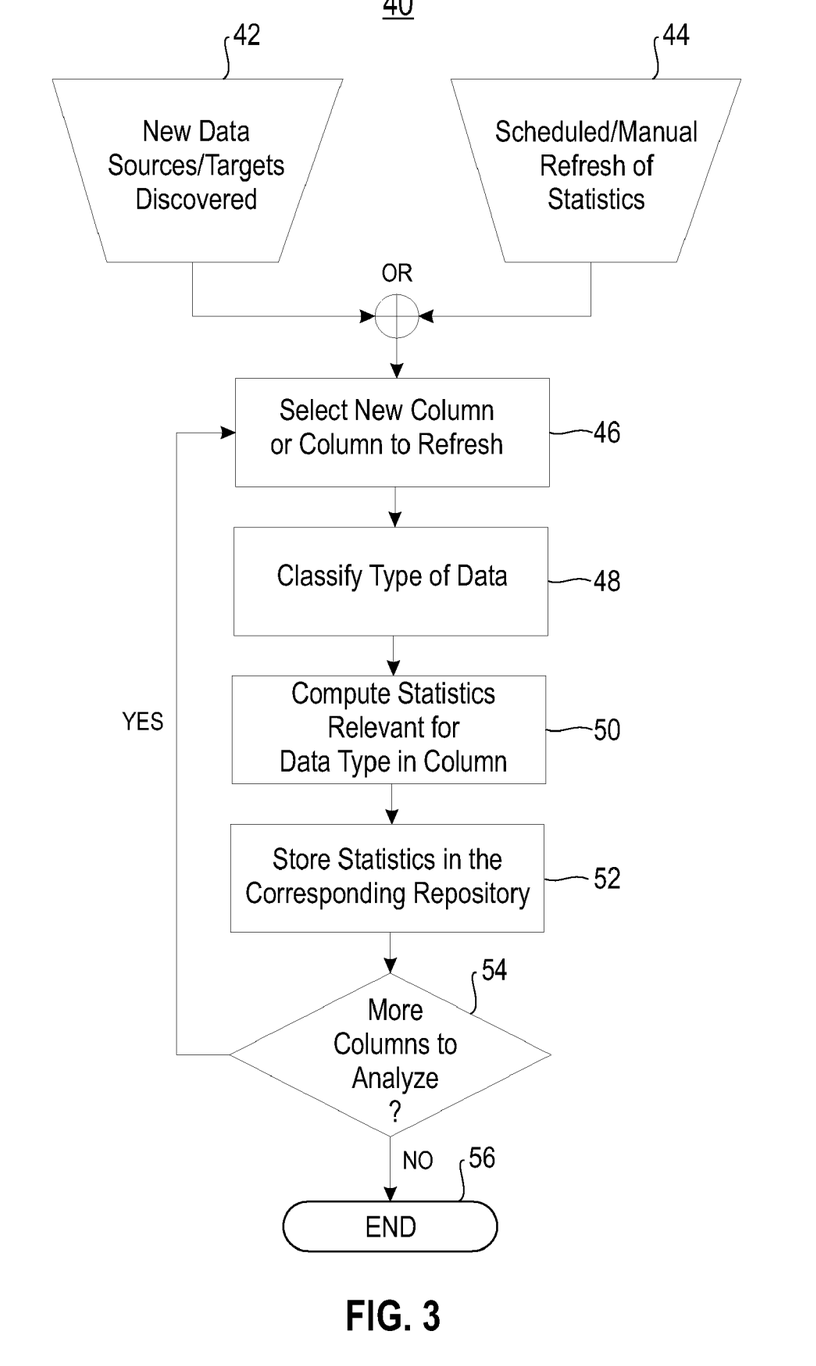
FIG. 3 is a flow chart representing background annotation of data sources and targets with column statistics, in accordance with the present invention.

FIG. 3 shows a flow diagram 40 of the background process that may be used to compute column statistics, in accordance with the present invention: The annotation of columns with statistics may start automatically when new data sources/targets are registered, at step 42, or the annotation may be started manually or automatically at a regular interval to refresh existing statistics, at step 44. In step 46, the type of data contained in a particular column may be classified for each column in which new statistics are to be computed, either because the table was previously unknown and the table columns were never annotated, or because the data in the table have changed so that the statistics are to be refreshed. If the data source is a table in a relational database, the type of data depends on the SQL type of the column.

Once the data type has been classified, in step 48, the corresponding statistics may be computed, in step 50. As explained above, mean and standard deviation may be computed for numeric data, for example. Alternatively, a mean or the number of characters, words, or letters may be computed for free text data. These statistics may be stored, in step 52, in a repository which associates the reference to the analyzed column and its statistics, for example. These statistics may be a table in a database or any other data repository, for example. In decision block 64, a determination may be made as to whether there are more columns to be analyzed. If yes, the process returns to step 46 and steps 46-52 are repeated for each column to be annotated. If it is determined, at decision block 54, that all columns have been analyzed, the process ends at step 56.

Figure 4:
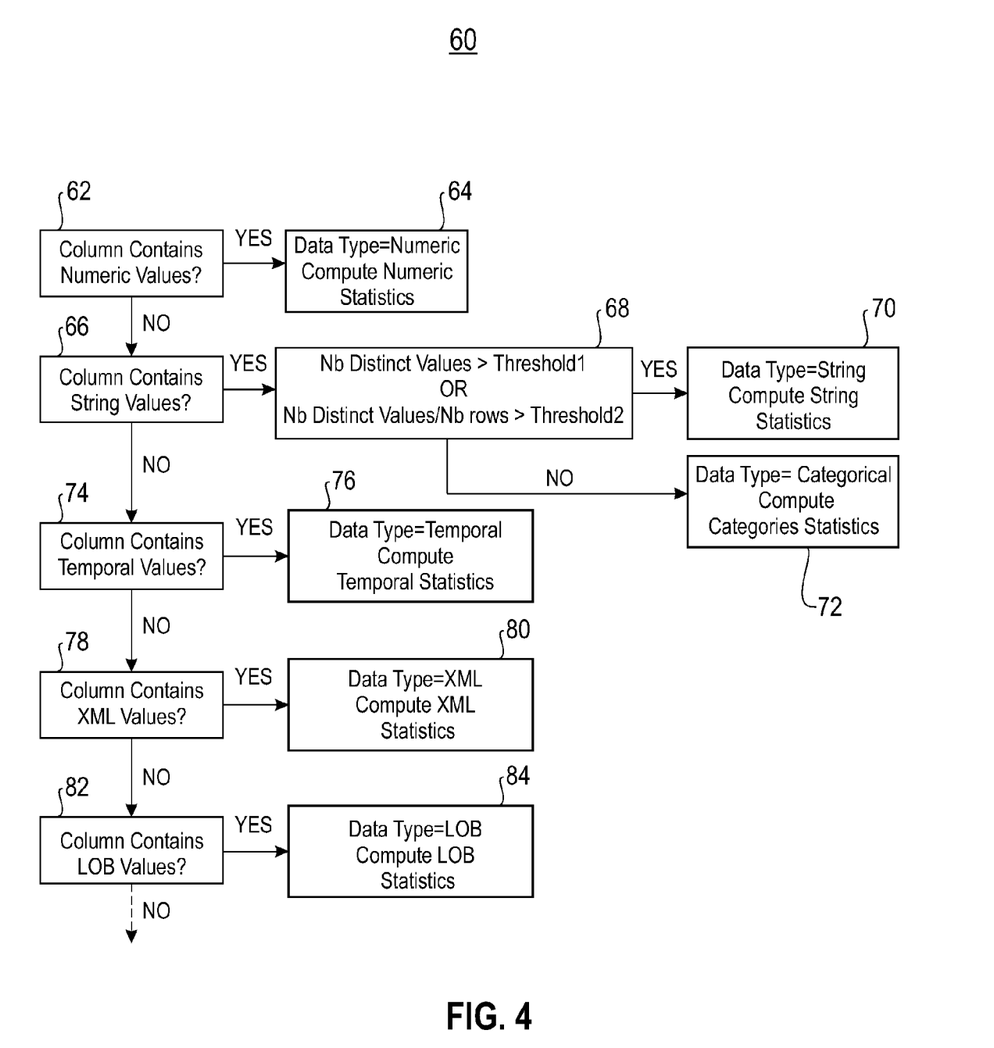
FIG. 4 is a flow diagram illustrating a process for categorization of a data type for a specific data column, in accordance with the present invention.

FIG. 4 shows a flow diagram 60 explaining how the categorization of a data type can be made. Decision block 62 checks if a column contains numeric values. If yes, the process proceeds to step 64 which assigns data type=numeric, and numeric statistics are computed. If no, the process proceeds to decision block 66 where a determination may be made as to whether the column contains string values. If yes, the process proceeds to step 68 where a determination may be made as to whether the number of distinct values is larger than a first threshold, denoted as thresholds, or if the ratio of the number of distinct values/number of distinct rows is larger than a second threshold, denoted as threshold2. This check may also be done for numeric data types as categorical information may be captured by numbers, such as integers. If the determination is 'yes,' at decision block 68, data type=string is assigned, and string statistics may be computed. If the determination is 'no,' at decision block 68, data type=categorical is assigned, and categorical statistics may be computed.

Which one of the tests with thresholds T1 or T2 is actually used or if both thresholds T1, T2 are used is a question of implementation, and the size of the thresholds T1, T2 is dependent on the actual case. For example, one rule could be that columns with more than one hundred distinct values (T1) or columns with T2>25% must not be categorized as categorical. However, whether the value for T1 should be closer to 100 or closer to 10000 is dependent on the system capability of how many categorical values can still be handled reasonably without degrading the system performance.

If the column contains neither numerical values nor string values, a determination may be made, at decision block 74, as to whether the column contains temporal values. If the determination is 'yes,' at decision block 74, data type=temporal may be assigned, and temporal statistics may be computed. If the determination is 'no,' at decision block 78, the column may be checked for XML values. If XML values are found, data type=XML may be assigned, and XML statistics may be computed, at step 80. If XML values are not found, the column is checked for LOB values, at decision block 82. If LOB values are found, data type=LOB may be assigned, and LOB statistics may be computed, at step 84.

Figure 5:
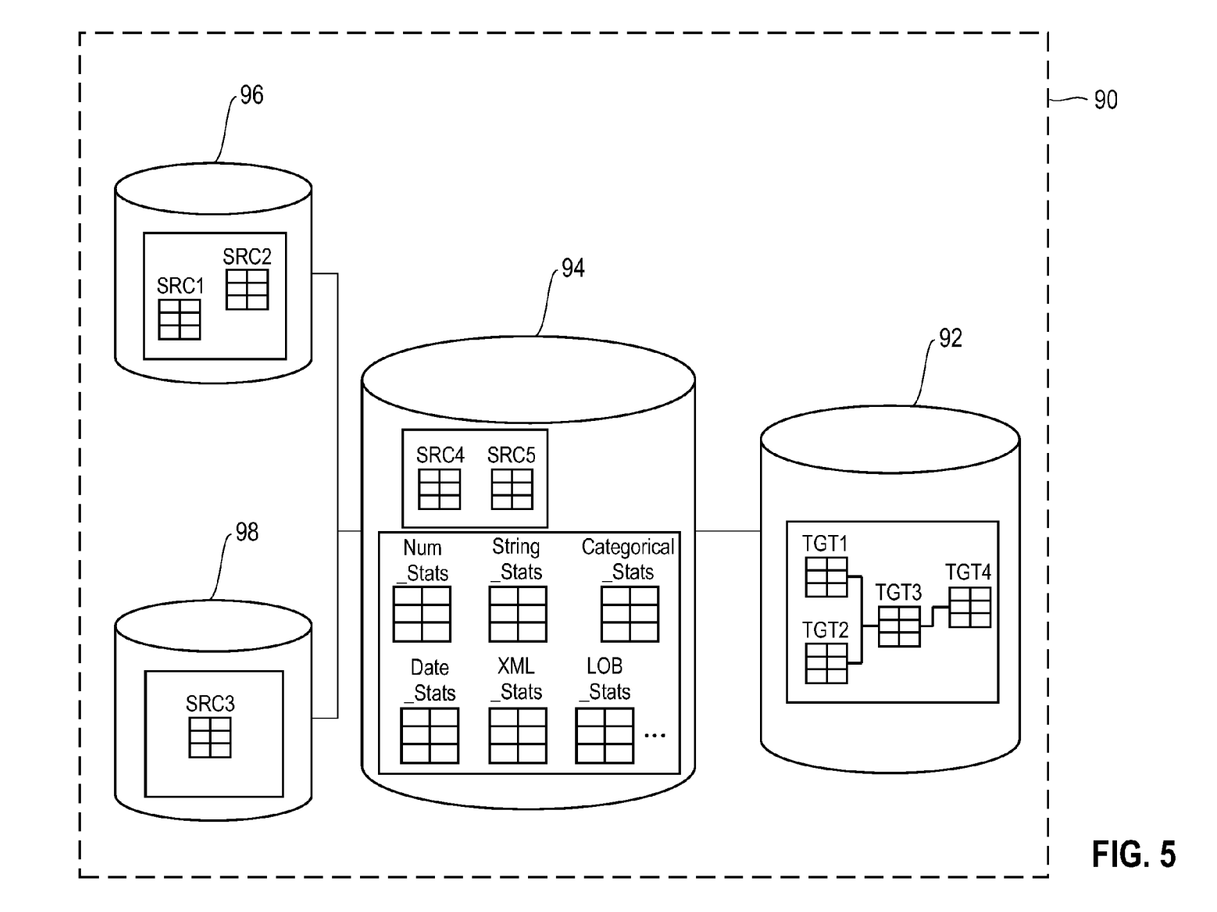
FIG. 5 is a diagrammatical illustration of a computing unit for storage of statistical annotations.

FIG. 5 illustrates how a preferred system infrastructure coupled to a computing unit 90 could be implemented in a database environment: A target data warehouse 92 may contain data targets TGT1 through TGT4 in one or several schemata. A database source 94 may contain a schema containing the statistics for each known column. The statistics in the database source 94 may be contained in tables denoted by NUM_STATS, STRING_STATS, CATEGORICAL_STATS, DATE_STATS, XML_STATS, and LOB_STATS, for example. Each table in the database source 94 may contain the statistics for one category of data type, i.e. statistics for different types of data have to be stored in different tables, because the nature of the statistics is different. Potential sources are represented by the tables SRC1 through SRC5 with additional database sources 96 and 98. The tables SRC1 through SRC5 can be stored in different databases or in the same database as the statistics, or even in the target data warehouse 92. It can be appreciated by one skilled in the art that the sources SRC1 through SRC5, the data targets TGT1 through TGT4, and the statistics tables shown in the database source 94 may alternatively be contained in one single database (not shown).

Figure 15:
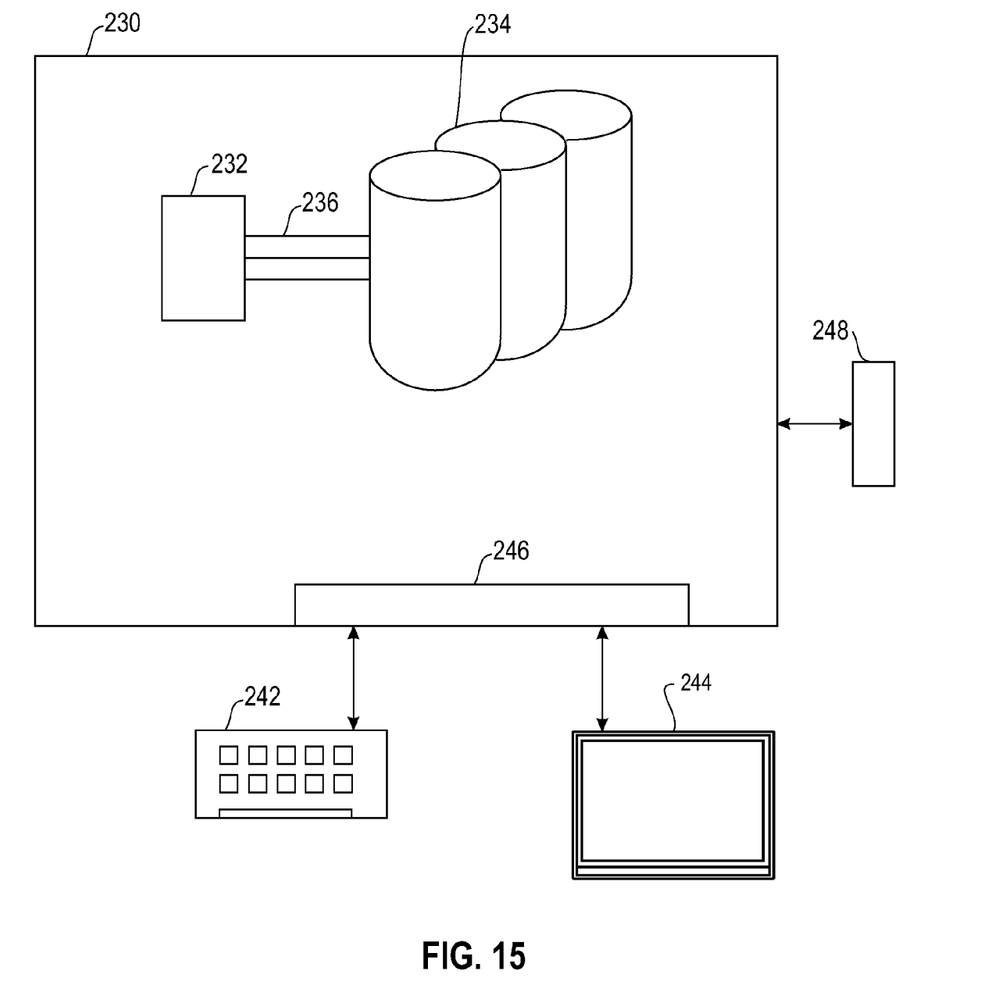
FIG. 15 is a data processing system suitable for executing the methods shown in FIGS. 3, 4, 6, and 12.

Each or all database sources 94, 96, and 98 can be directly or indirectly coupled to the computing unit 90. The computing unit 90, the target data warehouse 92, and the database sources 94, 96, and 98, can be directly or indirectly coupled to or comprised in a preferred data processing system 230, as shown in FIG. 15. The computing unit 90 may provide categorization of a data type of the data columns. The computing unit 90 can also provide computing of statistics of the data columns as well as storage space for storing the computed statistics described above. Further, the computing unit 90 can provide selection means to select a mapping candidate.

Figure 6:
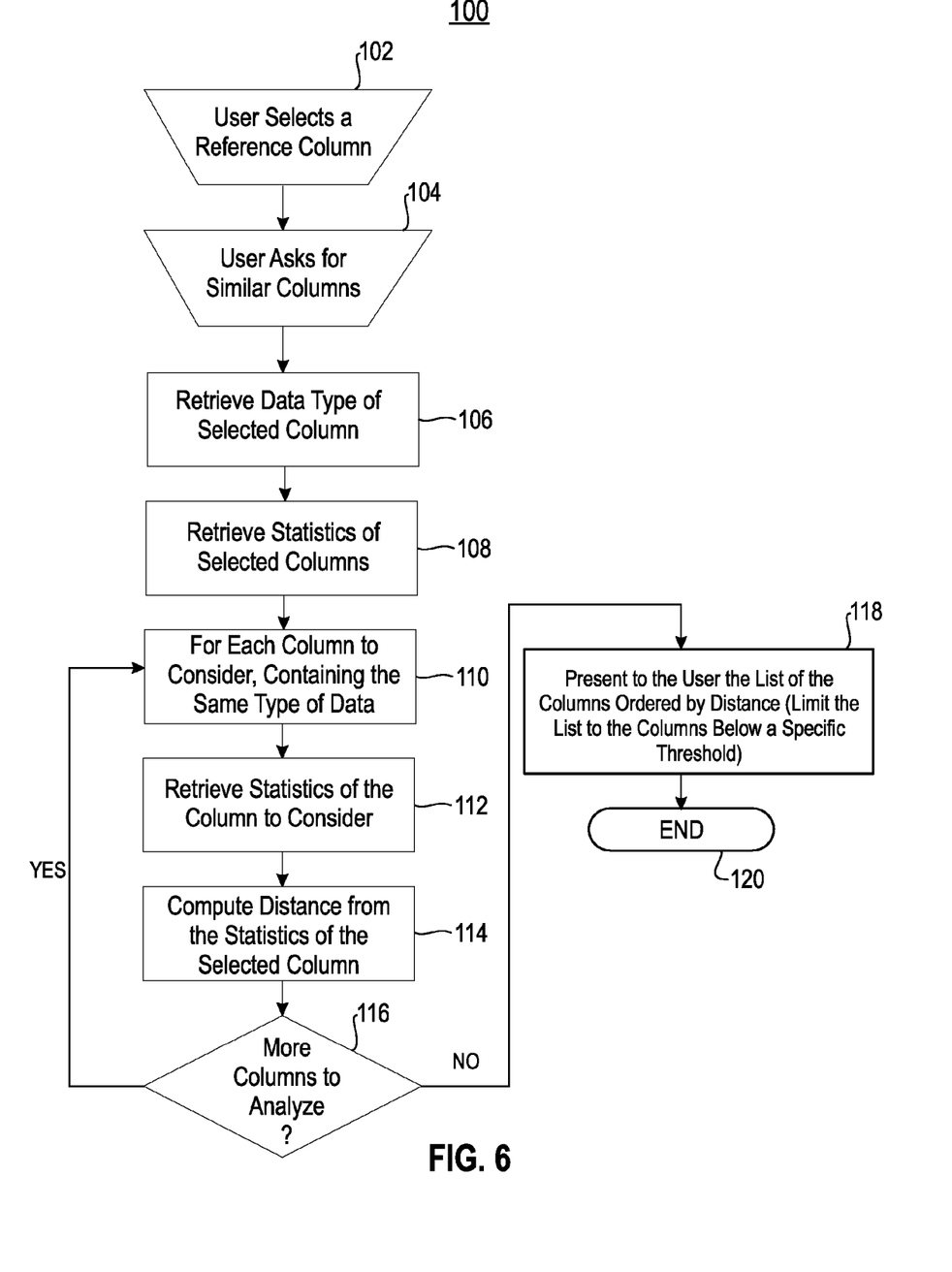
FIG. 6 is a flow diagram illustrating a search process when a user asks for columns similar to a reference column, in accordance with the present invention.

FIG. 6 shows the process started when a user asks for related columns in an extract, transform, and load (ETL) process to assemble data from various sources into a single database or mapping tool for instance: In step 102 the user selects a reference column for which similar or related columns may be found. In step 104, the user triggers asks for the related columns. In step 106, the data type of the selected column may be retrieved, analyzed, and classified. In step 108, statistics of the selected column and other columns having the same type may be retrieved.

For other columns, at step 110, having the same or a compatible data type, the statistics may be retrieved, at step 112, and a similarity, or distance, between the statistics of the reference column may be computed, at step 114. As used herein, a 'similarity' is a numerical value that indicates the similarity of two sets of statistics. This value can be computed by using various mathematical or statistical functions, known as similarity or distance measures in the relevant art. For example, the similarity may be found from a Euclidean n-distance, a chi-squared test, or may use a data mining method, such as clustering, to determine whether the statistics are sufficiently close. In decision block 116, a determination may be made as to whether more columns are to be analyzed. If the determination is 'yes,' the process returns to step 112.

Once the similarity of each column has been computed against the reference column, in step 118, the user is presented a list of the columns sorted by their similarity. The first columns in the list are the columns whose statistics are the most similar to the statistics of the reference column and are thus the best candidates. The list of the suggested columns can be limited, for example, by displaying only those columns whose similarities are above a predefined threshold. The process ends in step 120. The user can look at the suggestions and decide which column contains the searched information. The user is still free to ignore the sorting, but by using the disclosed method, the number of columns to inspect manually can be reduced to a smaller number.

Figure 7:
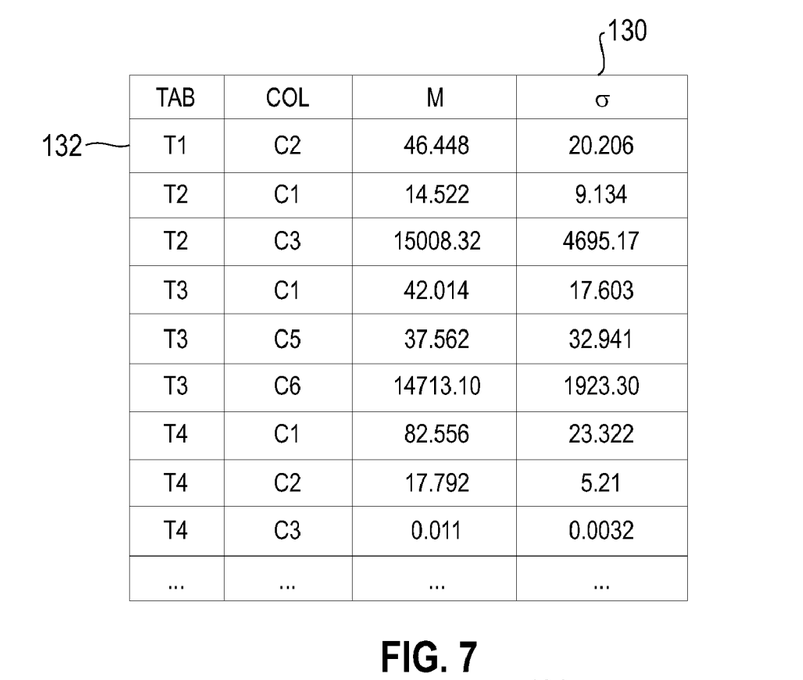
FIG. 7 is a table illustrating an example of statistics for a column containing numerical data.

FIG. 7 illustrates an example of statistics for numerical columns presented in a table 130. In this example only two simple statistics are computed: the mean 'M' and the standard deviation 'σ.' The first two columns of the table 130 contain the name of the columns COL and their tables TAB, and the two last columns of the table 130 include a column for M, and a column for σ. To illustrate the result shown in FIG. 7, consider that the user has chosen the first column T1.C2, represented by the first row, as a reference column 132, and is looking for the most similar numeric columns.

Figure 8:
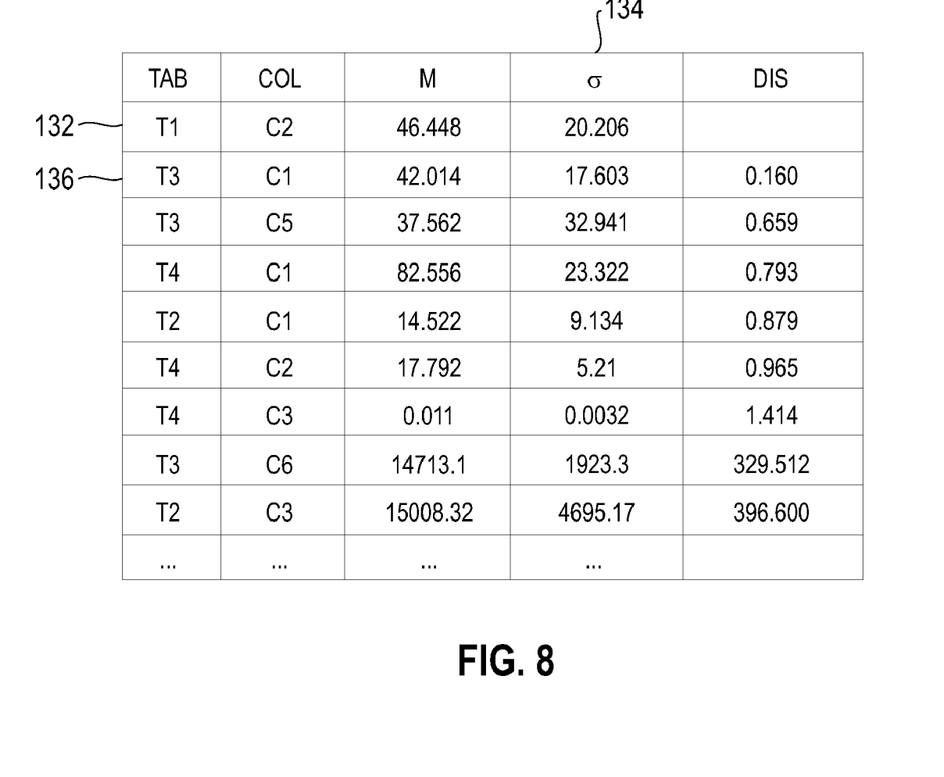
FIG. 8 is a table illustrating search results for columns containing numerical data based on the table of FIG. 7.

FIG. 8 shows the result of such an analysis, in a table 134. For each column, a distance measure 'DIS' has been computed. The distance measure DIS represents the difference between the statistics of a column in the table 130 and the statistics of the reference column 132. In this example, a simple distance function for Euclidean distances is used and the list of the columns is sorted by distance DIS with $$DIS(i) = \sqrt{\left(\frac{mean_i - mean_{ref}}{mean_{ref}}\right)^2 + \left(\frac{\sigma_i - \sigma_{ref}}{\sigma_{ref}}\right)^2}$$

where $mean_i$ and $\sigma_i$ are mean and standard deviation of the column i to be calculated, and $mean_{ref}$ and $\sigma_{ref}$ are mean and standard deviation of the reference column. As there are only two statistical values to be compared (i.e., mean and σ), the above formula is a simple p-2-norm distance. The values of $(mean_i - mean_{ref})$ and $(\sigma_i - \sigma_{ref})$ are normalized by their reference values in order to avoid an overweighting of one of the values. The data in T3.C1 appears to be the most similar to the data in the reference column T1.C2 from a statistical point of view and represents a best candidate 136 compared to the reference column 132.

Figure 9:
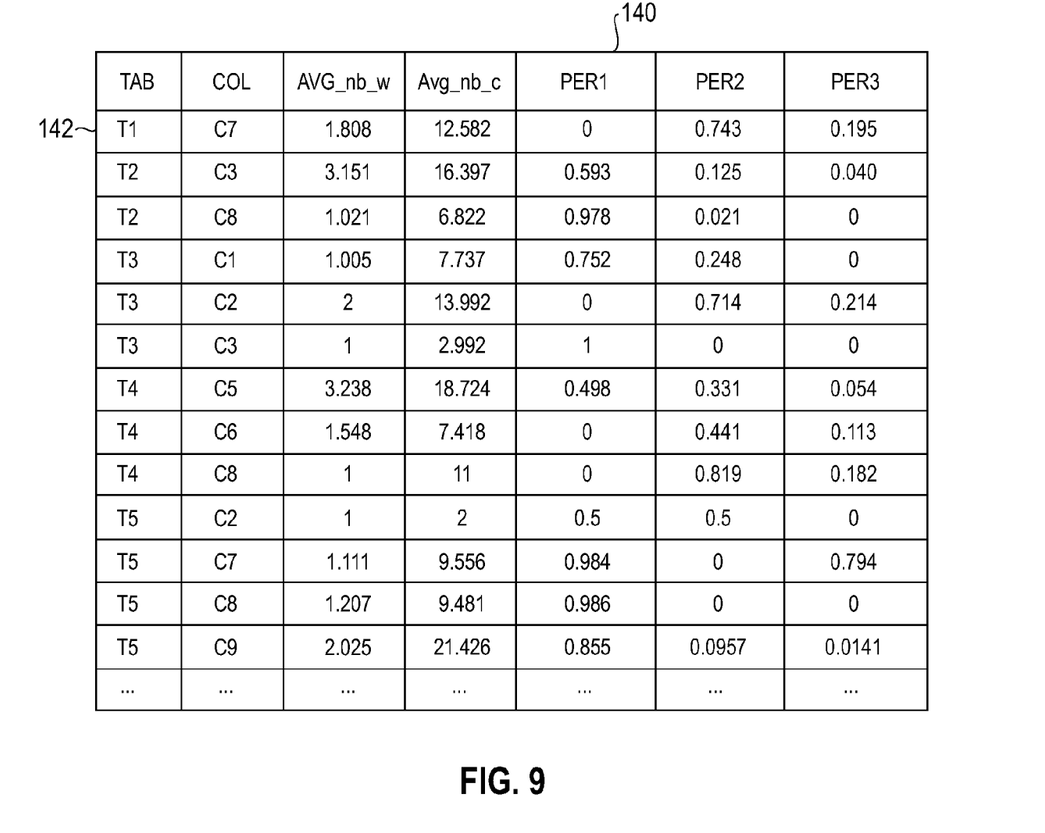
FIG. 9 is a table illustrating statistics for a column containing textual data.

FIG. 9 shows another example of statistics for text columns (i.e., non categorical statistics), in a table 140. Column 142 (T1.C7) is chosen as a reference column. In the example provided, the average number of words is denoted by AVG_nb_w, the average number of characters is denoted by AVG_nb_c, the percentage of characters which are letters is denoted by PER1, the percentage of characters which are digits is denoted by PER2, and the percentage of characters which are special characters is denoted by PER3. Other examples of statistics that can be computed and used for the computation of the similarity may include: frequencies of each character or group of characters, or the computation of a value for each row which is a function of the character codes in the strings, such as the sum of all character codes. The statistics to use for the computation of the similarity would be the mean value and standard deviation of this value for the whole column.

Figure 10:
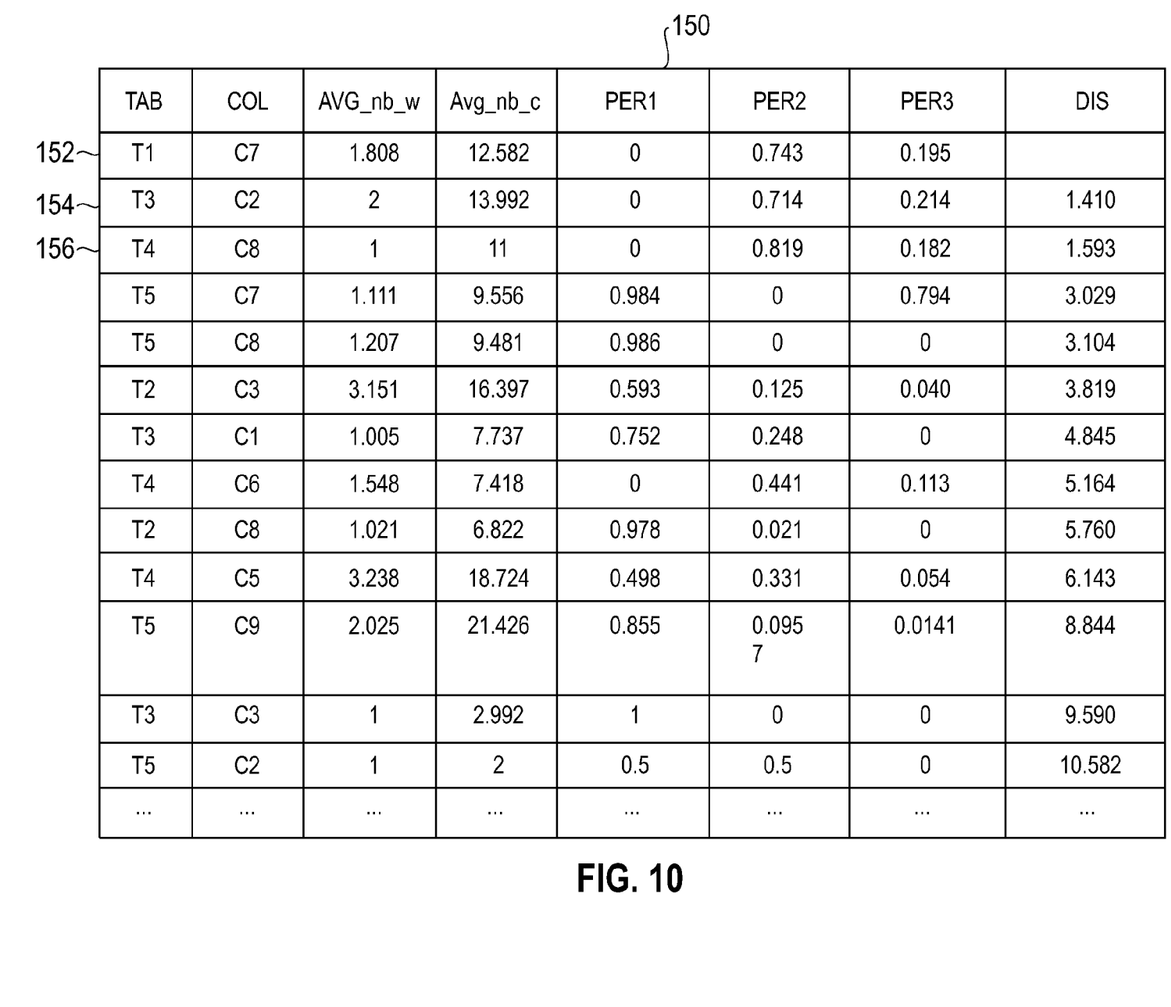
FIG. 10 is a table illustrating search results for columns containing textual data.

FIG. 10 shows the result of the analysis based on such text columns, presented as a table 150. For each column in the table 150, a distance DIS between its statistics and the statistics of the reference column 152 is computed. In the example provided, a p-5 distance formula is used for the five statistics which are collected. The list of the columns is sorted by the computed distance. A column 154 (T3.C2) and a column 156 (T4.C8) are the two columns whose data are most similar to the data of the reference column 152. Accordingly, columns 154 and 156 may be assigned as best candidates.

Here, a p-5-norm distance formula has been used as there are five parameters to compare with $$DIS(i) = \left((|AVG\_nb\_w_i - AVG\_nb\_w_{ref}|)^5 + \right.$$
$$(|AVG\_nb\_c_i - AVG\_nb\_c_{ref}|)^5 + +(|PER1_i - PER1_{ref}|)^5 +$$
$$\left. (|PER2_i - PER2_{ref}|)^5 + (|PER3_i - PER3_{ref}|)^5\right)^{\frac{1}{5}}$$

with index "ref" for the reference column and index "I" for the selected column. Alternatively, it may be possible to use a simple p-2-norm formula for calculating the distance DIS.

Figure 11:
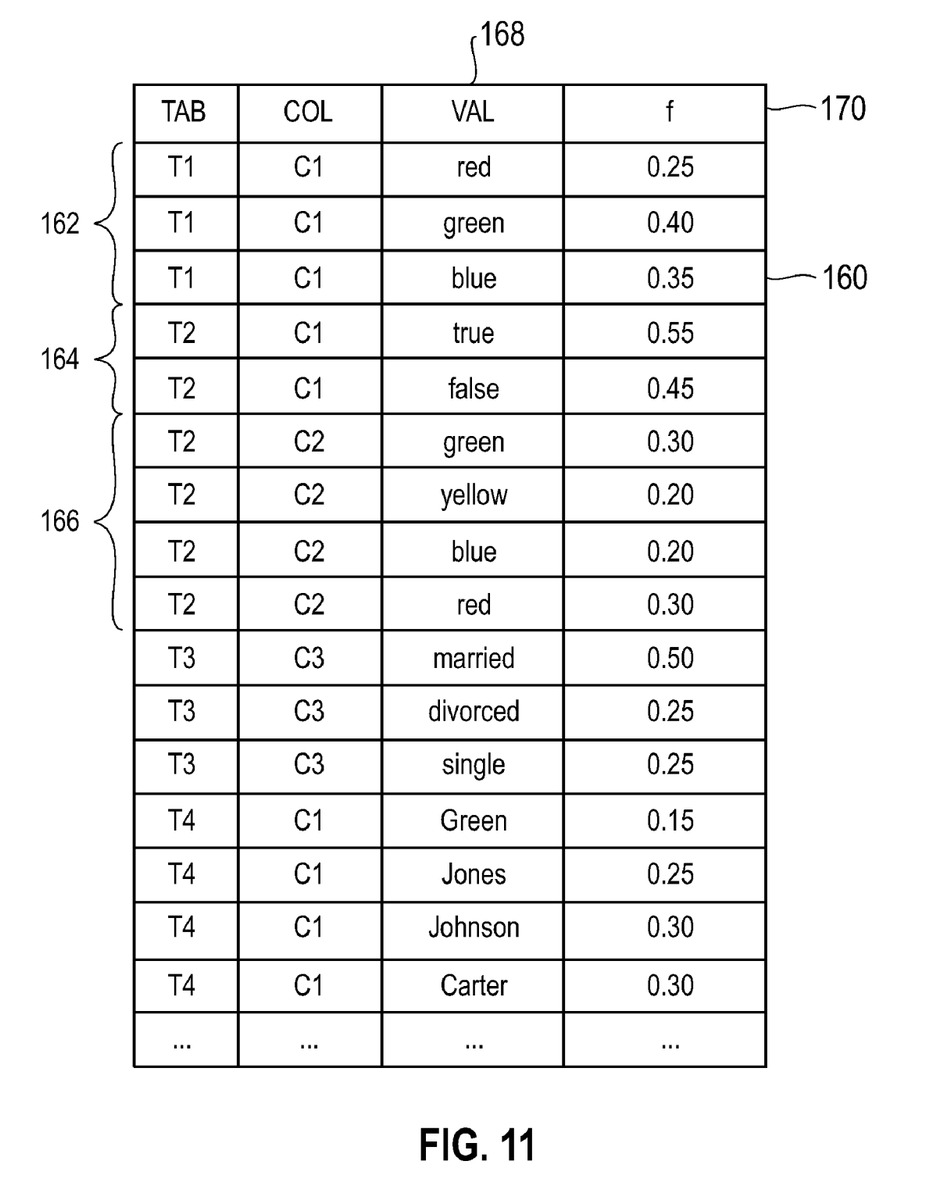
FIG. 11 is a table illustrating statistics for columns containing categorical data.

FIG. 11 shows another example of statistics for categorical data, presented as a table 160: In the case of categorical data, the statistics are the percental frequencies f of each category for each column. In this example, a first column set 162 (T1.C1) contains three different values (25% red, 40% green, 35% blue), a second column set 164 (T2.C1) contains two different values (55% true and 45% false), and a third column set 166 (T2.C2) contains four different values (30% green, 20% yellow, 20% blue, 30% red). Since the names and numbers of the categories can be different for each column set, these statistics are stored in a transposed table. Here, a table column 168 indicates the category (i.e., possible value 'VAL') and a table column 170 indicates the frequency 'f.' There may be more than one row describing one single column.

Figure 12:
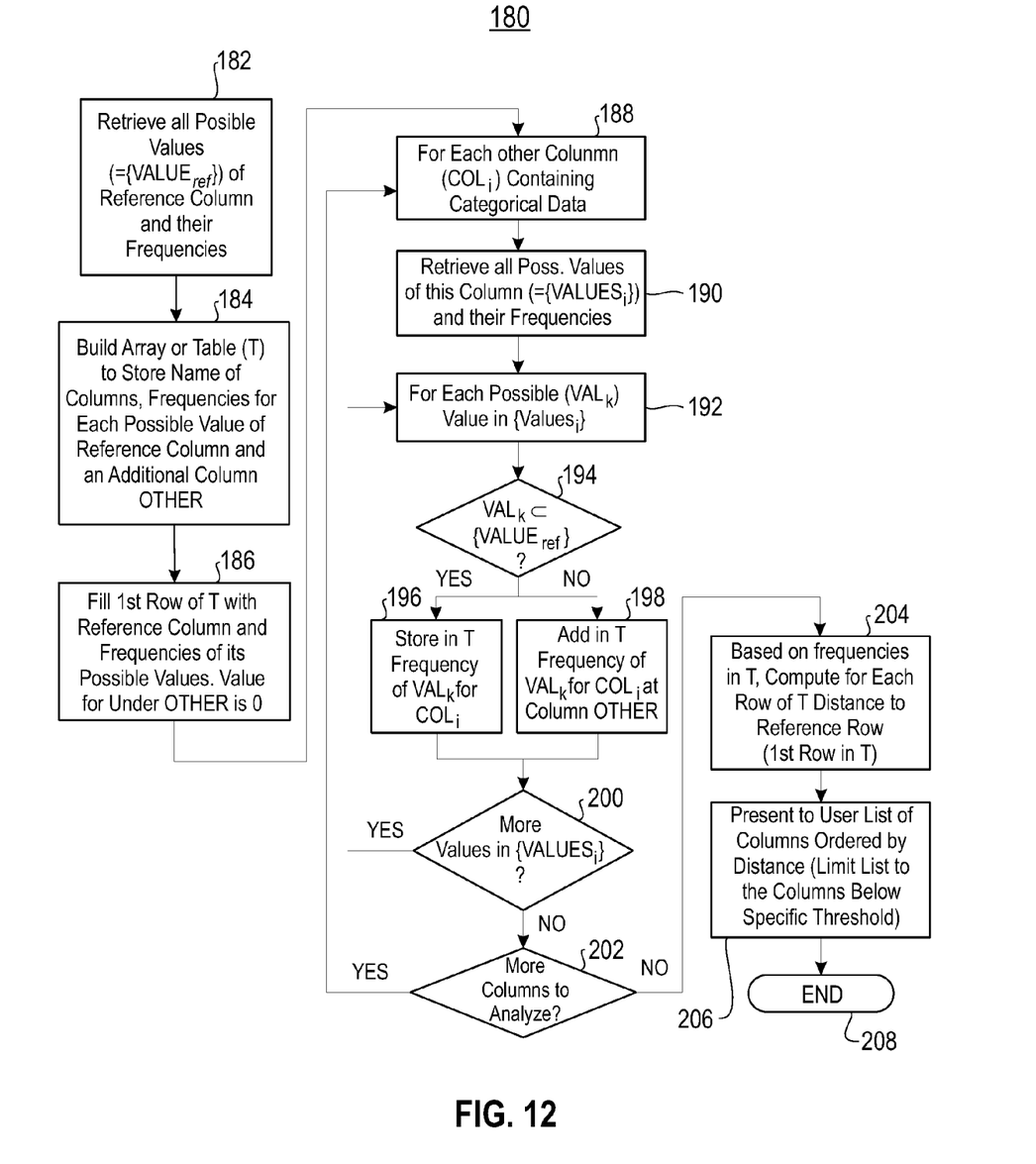
FIG. 12 is a flow chart representing a preferred search method of computing distance between similar columns containing categorical data.

FIG. 12 is a flow diagram 180 showing computation of the distance between two columns for statistics stored in such a transposed format (see FIG. 11): A reference column may be selected by the user (such as T1.C1 from the previous example of FIG. 11), in step 182. All possible values (={VALUES$_{ref}$}) of the reference column 162 and their frequencies may be retrieved. All possible values contained in the reference column 162 are retrieved (i.e., red, green, blue). In step 184, an array or table T may be generated to store the name of the columns, the frequencies for each possible value of the reference column, and an additional column "OTHER".

In step 186: the first row of table T may be filled with the reference column and the frequencies of its possible values. The value for "OTHER" is zero. In step 188, for each other column {COL$_i$} containing categorical data, all possible values of this column (={VALUES$_i$}) and their frequencies are retrieved, at step 190. At step 192, for each possible value (VAL$_k$) in {VALUES$_i$}, the value (VAL$_k$) is checked to see if it is contained within the value{VALUES$_{ref}$}, at decision block 194. If yes, the value for frequency of VAL$_k$ for Col$_i$ is stored in table T, at step 196. If no, at step 198, the frequency of VAL$_k$ is added to the table T for Col$_i$ at the column "OTHER".

At decision block 200, the process checks to determine if there are more values in {VALUES$_i$}. If yes, the process returns to step 192. If no, the process proceeds to decision block 202 where a check is made to determine if there are more columns to analyze. If yes, the process returns to step 188. If no, the process proceeds to step 204, where, the distance DIS to the reference row (first row in table T) is computed for each row of table T, based on the frequencies in table T. At step 206, the user is presented with the list of the columns ordered by distance DIS, that is, the list is limited to the columns below a specified threshold. The process ends at step 208.

Figure 13:
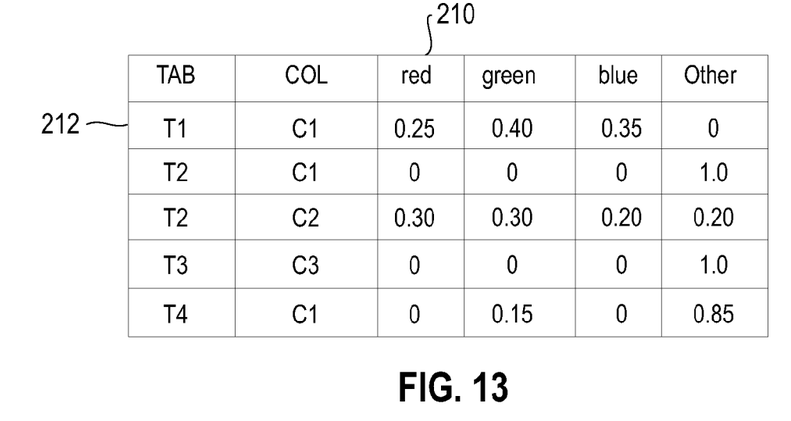
FIG. 13 is a table illustrating search results of a transposition of statistics for columns containing categorical data.

As can be appreciated, all possible values of the reference column may be presented by individual columns. One additional column "Other" may be added for values that appear in analyzed columns but not in the reference column, as shown in table 210 of FIG. 13, for example. The first row 212 of the table 210 contains the frequencies of each possible value {red, green, blue} in the reference column. Hence the value for "Other" has to be 0. Then for each column to analyze, the list of possible values and their frequencies are retrieved. For the possible values which are contained in the list of the possible values of the reference column, the frequency of the value is directly stored in the column corresponding to the value. If the value is not one of the existing values of the reference column, its frequency is added to "Other".

Figure 14:
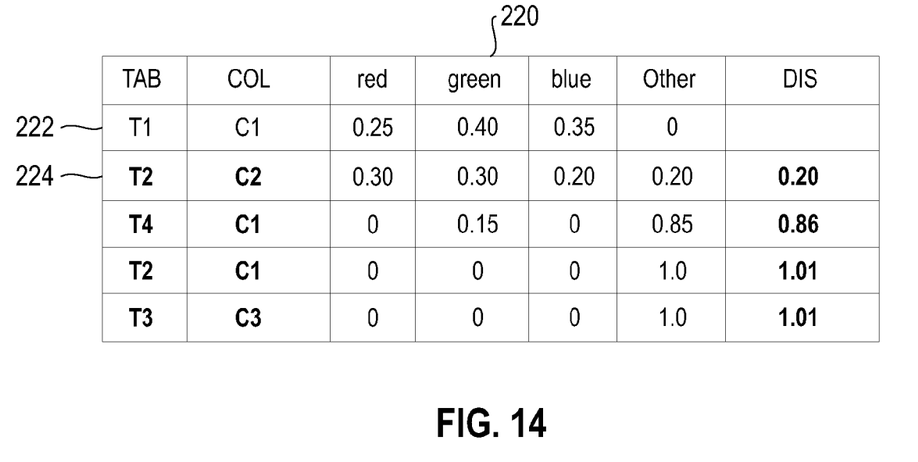

The result is a transposed table 220, as shown in FIG. 14 when the same statistical/mathematical methods can be used to compute a distance in the same way it was done for the other kinds of statistics. FIG. 14 shows the result of the transposition of the example shown in FIG. 11, where the reference column 222 is T1.C1.

FIG. 14 shows the result of the analysis: a distance DIS is computed by using a simple p-4-norm distance formula with $$DIS(i) = \left((RED_i - RED_{ref})^4 + (GREEN_i - GREEN_{ref})^4 + \right.$$
$$\left. (BLUE_i - BLUE_{ref})^4 + +(OTHER_i - OTHER_{ref})^4\right)^{\frac{1}{4}}$$

However, another appropriate distance formula can be chosen. The list of the columns is sorted by that distance DIS. In this example, the column containing the most similar data is T2.C2 and denoted as best candidate 224.

The invention can take the form of an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

An exemplary embodiment of a preferred data processing system 230 is depicted in FIG. 15. The data processing system 230 is suitable for storing and/or executing program code and comprises at least one processor 232 coupled directly or indirectly to memory elements 234 through a system bus 236. The memory elements 324 can include local memory employed during actual execution of the program code, bulk storage, and cache memories which provide temporary storage of at least some program code in order to reduce the number of times code must be retrieved from bulk storage during execution. An input device 242 and an output device 244, such as, for example, a keyboard, a display, or a pointing device, can be coupled to the system 230 either directly or through intervening I/O controllers 246.

Network adapters 248 may also be coupled to the system 230 to enable the data processing system or remote printers or storage devices through tangible intervening private or public networks. Modems, cable modem and Ethernet cards are just a few of the currently available types of network adapters. The computing unit 90, as well as the target data warehouse 92 and the database sources 94, 96, and 98, as depicted in FIG. 5, can be directly or indirectly coupled to, or comprise, the preferred data processing system 230.

It should be understood that the systems of FIGS. 5 and 15 illustrates only an example of the hardware configuration of a computer that implements this embodiment, and other various configurations can be employed as long as this embodiment can be applied thereto. While the foregoing components have been described in the context of fully functioning computers and computer systems, those skilled in the art will appreciate that the various embodiments of the invention are capable of being distributed as a program product in a variety of forms, and that the invention applies equally regardless of the particular type of signal-bearing media used to actually carry out the distribution. Examples of signal-bearing media include, but are not limited to, the computer media described above and tangible transmission type media, such as tangible digital and analog communication links. It will further be appreciated by those skilled in the art that changes in these embodiments may be made without departing from the principles and spirit of the invention, the scope of which is defined by the appended claims.

What is claimed is:

1. A method for mapping data from a database source to a data target, comprising:
defining at least one reference column of the data target;
performing a comparison of data contained in at least one data column in the database source and data contained in said at least one reference column;
determining mapping candidates between said at least one data column and said at least one reference column based on said comparison of data; and
performing a comparison of statistical properties of said at least one data column and said at least one reference column,
wherein the statistical properties include relative frequency of the characters in the at least one data column and the at least one reference column with respect to each other.

2. The method according to claim 1 wherein said step of determining includes:
comparing the schema of the at least one data column and the at least one reference column; and
identifying mapping candidates based on a comparison of the statistical properties of the data column and the reference column.

3. The method according to claim 2 wherein said statistical properties are a function of the data type contained in the data columns and the data type contained in the data target.

4. The method according to claim 3 wherein said data type contained in the data columns and the data type contained in the data target both comprise one of numeric data, categorical data, and free text data.

5. The method according to claim 3 wherein said statistical properties are the same for said data columns of the same type.

6. The method according to claim 2 further comprising the step of annotating data in said data columns using said statistical properties.

7. The method according to claim 2 further comprising the step of computing statistics when either a new database source or a new data target is registered.

8. The method according to claim 2 further comprising the step of computing statistics when a user begins the mapping of data from the database source to the data target.

9. The method according to claim 8 further comprising the step of storing said computed statistics.

10. The method according to claim 2 further comprising the step of computing a similarity between statistical properties of data in said reference column and data in said database source column.

11. The method according to claim 2, including:
determining mapping candidates having best matches; and
presenting said mapping candidates having best matches to a user.

12. The method according to claim 11 wherein said step of presenting comprises the step of confirming a selection of one of said mapping candidates by a user.

13. A program product comprising a physical computer useable storage medium including a computer readable program, which executed on a computer causes the computer to:
perform a comparison of data contained in at least one data column of a database source stored on the physical computer usable storage medium with data in at least one reference column in a data target; and
determine mapping candidates between said at least one data column and said at least one reference column based on said comparison of data; and
annotate data in said at least one data column using statistical properties obtained from said at least one data column and said at least one reference column,
wherein the statistical properties include relative frequency of the characters in the at least one data column and the at least one reference column with respect to each other.

14. The program product according to claim 13,
wherein the statistical properties are computed at predetermined periodic intervals.

15. The program product according to claim 14 wherein said statistical properties are a function of the data type contained in the data columns and the data type contained in the data target.

16. The program product according to claim 15 wherein said data type contained in the data columns and the data type contained in the data target both comprise one of numeric data, categorical data, and free text data.

17. The program product according to claim 14 wherein said statistical properties are the same for said data columns of the same type.

18. The program product according to claim 14 wherein statistics are computed when either a new database source or a new data target is registered.

19. The program product according to claim 14 wherein statistics are computed when a user begins a mapping of data from the database source to the data target.

20. The program product according to claim 13 wherein a similarity is computed between statistical properties of data in said reference column and data in said database source column.

* * * * *